(12) United States Patent
Johnston et al.

(10) Patent No.: US 6,523,635 B1
(45) Date of Patent: Feb. 25, 2003

(54) STEERING AND GROUND SPEED CONTROL MECHANISM OF A DUAL-PATH HYDROSTATIC DRIVE SYSTEM

(75) Inventors: Robert James Johnston, Oskaloosa, IA (US); Thomas Daryl Bebernes, Ottumwa, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/432,680

(22) Filed: Nov. 2, 1999

(51) Int. Cl.$^7$ .............................................. B60K 17/00
(52) U.S. Cl. ........................ 180/307; 180/6.48; 74/496
(58) Field of Search ................................. 180/305, 307, 180/6.2, 6.3, 6.32, 6.48; 74/495, 496

(56) References Cited

U.S. PATENT DOCUMENTS

| | | | |
|---|---|---|---|
| 1,588,974 A | * 6/1926 | Masury et al. ................. | 74/496 |
| 1,590,858 A | * 6/1926 | Samuels ....................... | 74/496 |
| 3,080,953 A | * 3/1963 | Edgemond et al. ........... | 74/495 |
| 3,520,210 A | * 7/1970 | Tarrant ......................... | 74/496 |
| 4,399,882 A | * 8/1983 | O'Neill et al. ............. | 180/6.48 |
| 4,875,536 A | * 10/1989 | Saur et al. .................. | 180/6.32 |
| 5,131,483 A | * 7/1992 | Parkes ....................... | 180/6.48 |
| 5,383,528 A | * 1/1995 | Nicol .......................... | 180/6.2 |
| 5,649,606 A |   7/1997 | Bebernes et al. ........... | 180/307 |
| 5,715,902 A | * 2/1998 | Petrovich et al. ........... | 180/167 |

FOREIGN PATENT DOCUMENTS

| | | | | |
|---|---|---|---|---|
| DE | 1945646 | * 9/1970 | ................. | 180/6.3 |
| GB | 966692 | * 8/1964 | ................. | 180/6.48 |
| JP | 57-37071 | * 3/1982 | ................. | 180/6.48 |
| JP | 2-38186 | * 2/1990 | ................. | 180/6.3 |

* cited by examiner

Primary Examiner—Frank Vanaman

(57) ABSTRACT

A vehicle has a pair of opposite drive wheels driven by a dual path hydrostatic transmission. Steering and speed/direction controls are effected by changing the displacement and/or direction of fluid flow through the pair of reversible, variable displacement pumps that are respectively coupled to fixed displacement ground wheel drive motors. The control mechanism for accomplishing steering and/or speed/direction control includes a steering rack that is caused to pivot about a fixed post in response to steering wheel movement. A first crank arm is coupled for pivoting in concert with the rack and a second crank arm is coupled for pivoting in concert with a pivot plate about a second axis, the pivot plate having a pair of connection points respectively coupled to control arms of the pair of pumps by a pair of pump control rods. The pivotal motion of the steering rack is transmitted to the pivot plate by a tie-rod coupled between the first and second crank arms. This tie-rod is parallel to a pivot support bar that swings about the fixed post in response to fore-and-aft movement of a speed/direction control lever, the pivot plate being pivotally mounted to the free end of the pivot support bar. Thus, the pivot support bar, first and second crank arms and the tie-rod cooperate to define a four-bar linkage that causes the pivot plate to retain its pivoted position about the second axis during speed/direction control so that such control is made independently of steering, and vice-versa.

4 Claims, 3 Drawing Sheets

STEERING AND GROUND SPEED CONTROL MECHANISM OF A DUAL-PATH HYDROSTATIC DRIVE SYSTEM

BACKGROUND OF THE INVENTION

The present invention relates to a vehicle having ground drive wheels which are hydrostatically driven, and more particularly relates to controls for a dual-path hydrostatic drive system.

U.S. Pat. No. 5,649,606 granted to Bebernes et al. on Jul. 22, 1997 discloses a dual-path hydrostatic drive system which is controlled by a steering and ground speed control mechanism including a steering rack in the form of a sector which is pivoted to opposite sides of a neutral position in response to steering wheel operation. This movement of the steering rack is transmitted to a first sprocket of a timing belt drive having a second sprocket joined to an output member that is linked with the hydrostatic transmission pump controllers.

This steering control is not entirely satisfactory due to the cost and complexity of the timing belt drive, the latter requiring the center distance between its input and output sprockets to be adjusted to maintain proper belt tension while at the same time maintaining proper alignment between the two sprockets.

SUMMARY OF THE INVENTION

According to the present invention there is provided a steering and ground speed control mechanism which represents an improvement over the control mechanism disclosed in U.S. Pat. No. 5,649,606.

A broad object of the invention is to provide a steering and ground speed control mechanism for a dual-path hydrostatic transmission, the mechanism including a quadrant-shaped steering rack but being more economical and less complex than the control mechanism disclosed in U.S. Pat. No. 5,649,606.

A more specific object of the invention is to provide a control mechanism as set forth in the immediately preceding object wherein a four-bar linkage is used for transmitting pivotal motion of the steering rack quadrant to the output plate that is linked to the hydrostatic transmission pump controllers.

These and other objects will become more apparent from a reading of the ensuing description together with the appended drawings.

DESCRIPTION OF THE PREFERRED EMBODIMENT

Figure 1:
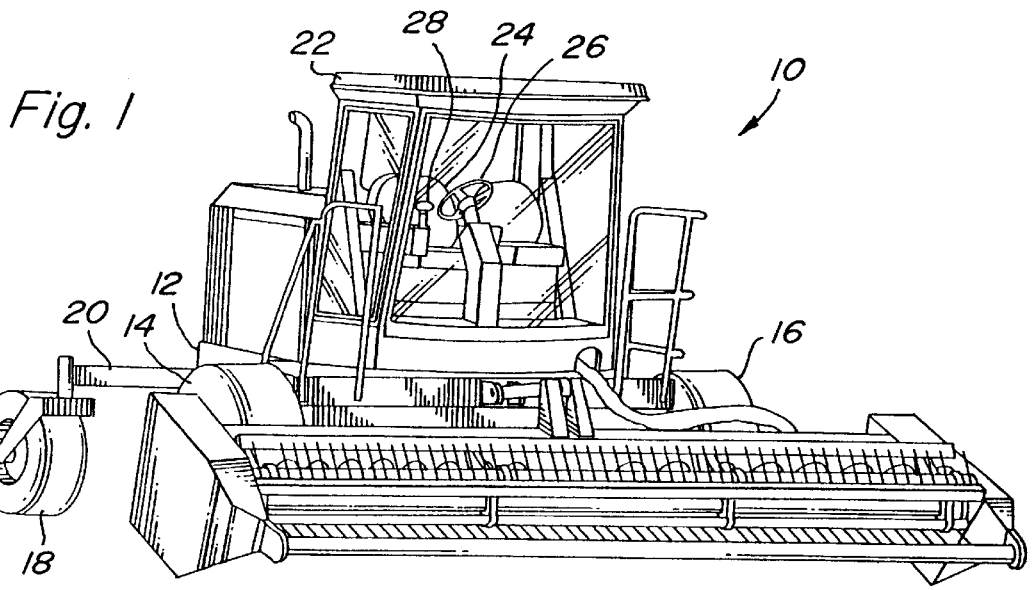
FIG. 1 is a left front perspective view of a self-propelled windrower of the type with which the present invention is particularly adapted for use.
Figure 2:
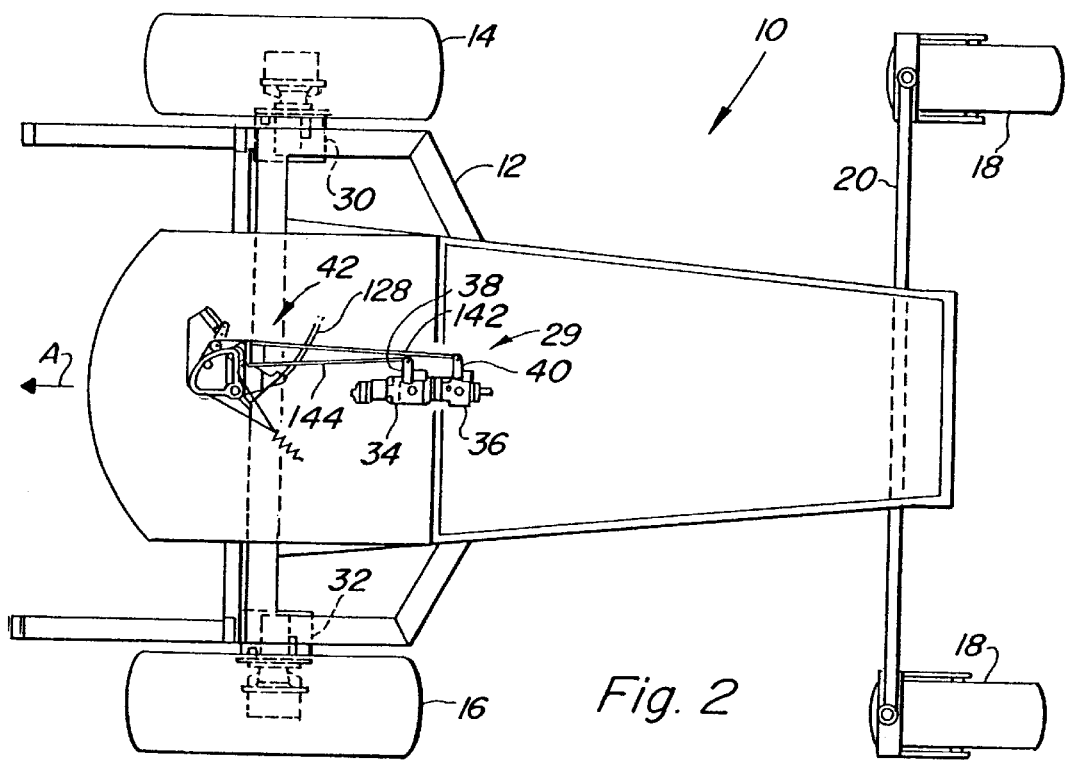
FIG. 2 is a schematic top plan view showing the placement of the hydrostatic drive system components within the general outline of the windrower shown in FIG. 1.

Referring now to FIGS. 1 and 2, there is shown a self-propelled vehicle 10 in the form of a self-propelled mower-conditioner having a main frame 12 supported on right- and left-hand front drive wheels 14 and 16, respectively, and on a pair of rear ground wheels 18 castor-mounted to opposite ends of a cross axle 20 that is mounted to the main frame 12, in a known manner not shown, for oscillating about a horizontal, fore-and-aft axis located centrally between the wheels 18. An operator's cab 22 is supported on the forward end of the main frame 12 and contains a seat 24 mounted to a floor (not shown) of the cab in easy reach of a steering wheel 26 positioned forwardly of the seat. Mounted to a right-hand armrest (not shown) of the seat 24 i a speed/direction control lever 28.

The wheels 14 and 16 are driven by a dual-path hydrostatic transmission system 29 (FIG. 2) including right- and left-hand fixed displacement motors 30 and 32 respectively coupled to the right- and left-hand drive wheels 14 and 16. Front and rear variable displacement, reversible pumps 34 and 36, respectively, are conventionally fluid coupled to the motors 30 and 32, as by respective pairs of supply/return lines (not shown), are mounted centrally on the main frame 12 and are coupled for being driven by an output shaft of the vehicle engine (not shown). The pumps 34 and 36, respectively have swash plate control arms 38 and 40 that are each mounted for pivotal movement from a centered, zero displacement "neutral" position, as shown, with increasing rearward and forward movement respectively effecting increasing displacement so as to effect increasing forward and reverse driving speeds of the motors 30 and 32.

Figure 3:
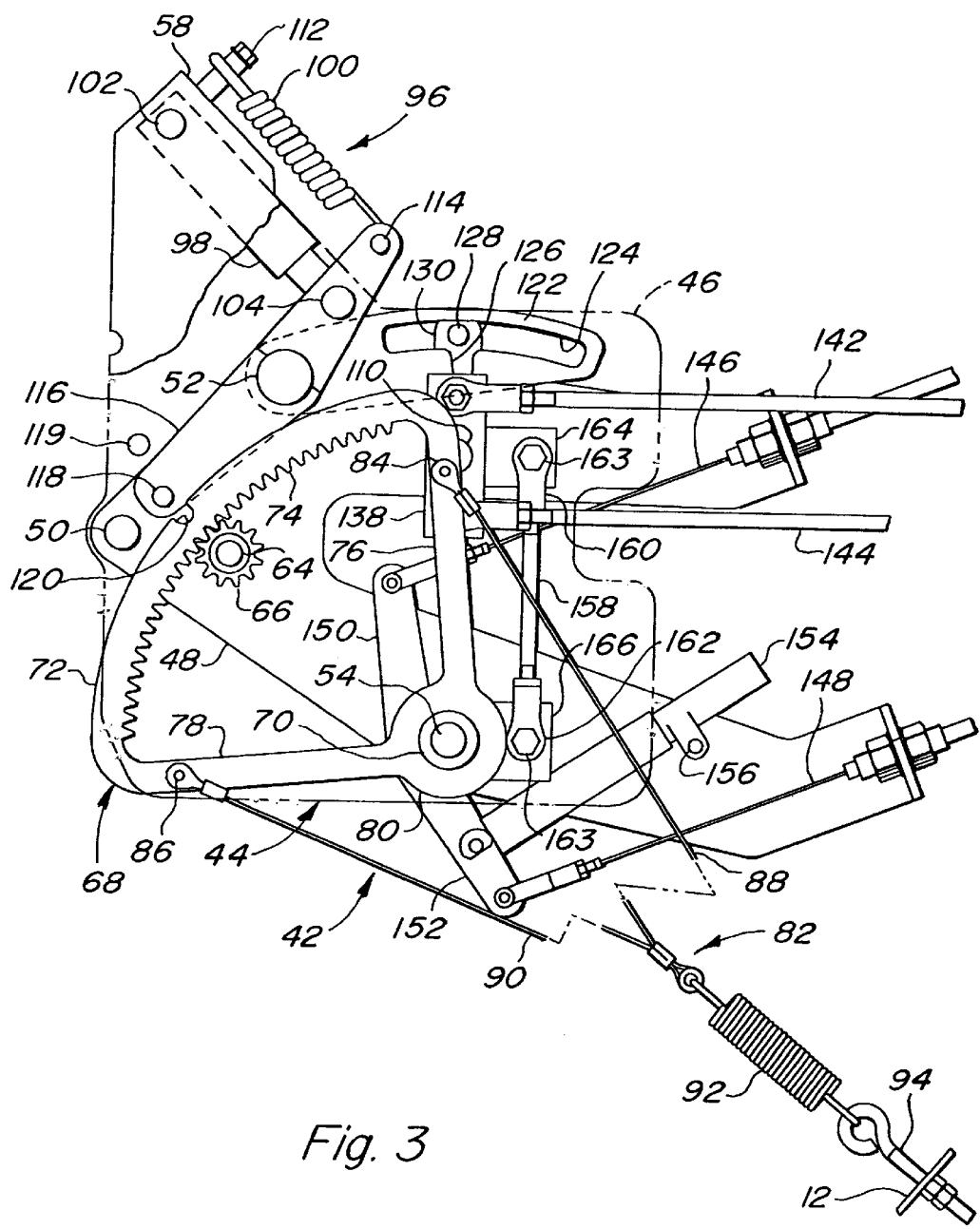
FIG. 3 is an enlarged top plan view of the control mechanism for the drive system shown in FIG. 2, with the top plate of the mounting frame being shown in phantom outline for revealing components located beneath the plate, these components being shown in a condition corresponding to the steering wheel being in a "centered" position and the speed/direction control lever being in a "neutral" position.
Figure 4:
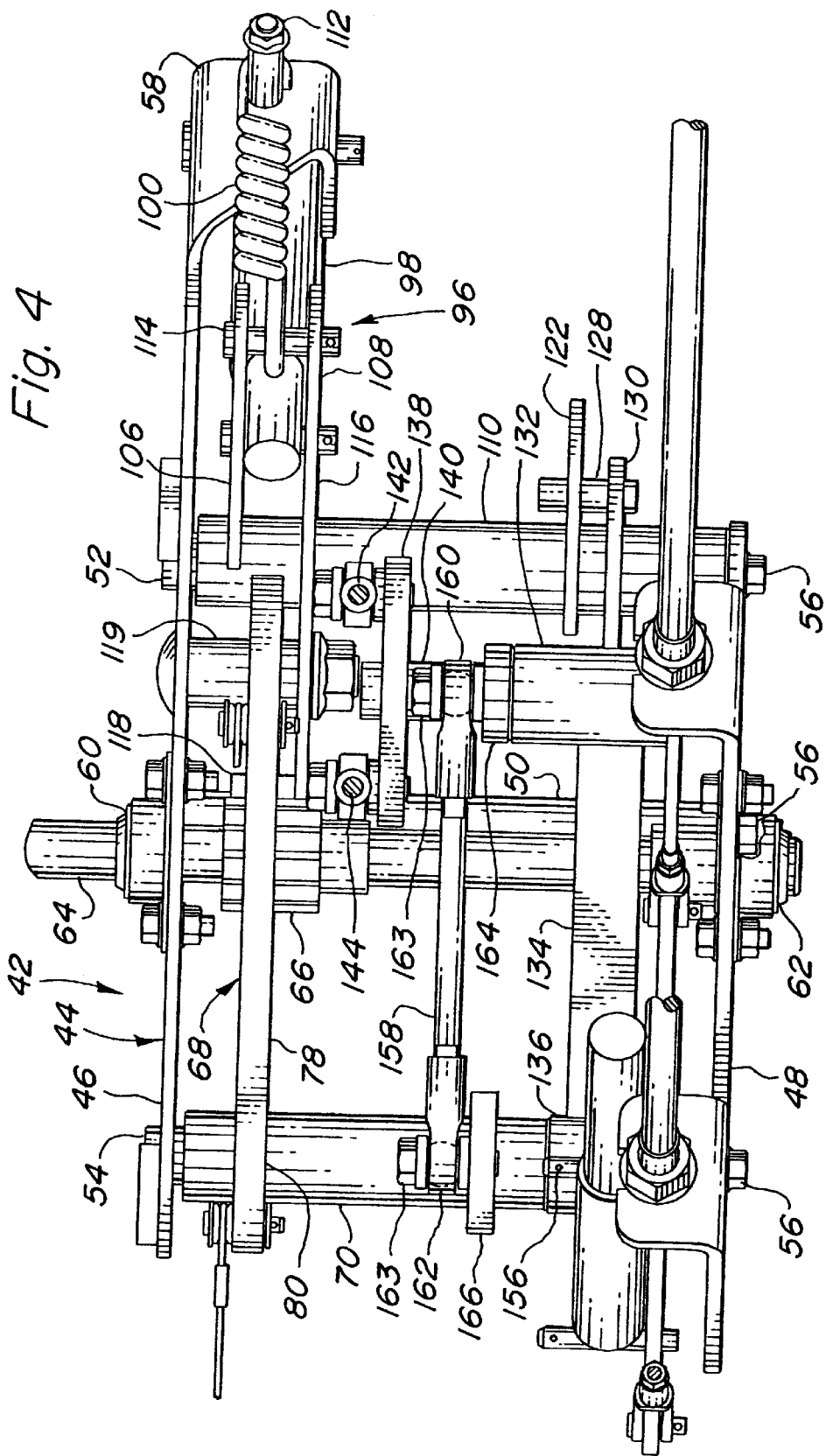
FIG. 4 is an enlarged rear elevational view of the structure shown in FIG. 3, but with some parts broken away for clarity.

Referring now also to FIGS. 3 and 4, there is shown a control mechanism 42 for receiving inputs from the steering wheel 26 and the speed control lever 28 and delivering corresponding outputs, in a manner described below, to the swash plate control arms 38 and 40 of the pumps 36 and 34. Specifically, the control mechanism 42 includes a support structure 44 comprising upper and lower plates 46 and 48, with the upper plate being adapted for being bolted to the bottom of the operator's cab 22. A major portion of each of the plates 46 and 48 is horizontal and these portions are fixed in spaced, parallel relationship by three vertical posts 50, 52 and 54, each having its upper end welded into a respective hole provided in the upper plate 46, and each having its lower end secured to the lower plate 48 by a respective cap screw 56 threaded axially into the associated post. As considered from front to rear of the support structure 44, the posts 50, 52 and 54 are respectively positioned at a front central, right-hand intermediate and left-hand intermediate locations, with the post 52 being located about midway between the posts 50 and 54 in the fore-and-aft direction. The upper plate 46 includes a u-shaped cylinder and spring mounting bracket 58 formed at the right front thereof.

The steering wheel 26 initiates steering input signals which are coupled, by a train of motion transfer elements, for effecting desired movement of the swash plate control arms 38 and 40, (FIG. 2) respectively, of the pumps 34 and 36. Upper and lower, self-aligning bearing assemblies 60 and 62 (FIG. 4) are respectively bolted to top and bottom surfaces of, and in alignment with vertically aligned holes provided in, the upper and lower mounting plates 46 and 48 at a location leftwardly and rearwardly of the front post 50. The steering wheel 26 is coupled in a well known manner, not shown, to a steering shaft 64 mounted for rotation in the bearing assemblies 60 and 62. A pinion 66 is fixed on the steering shaft 64 at a location spaced a small distance below the upper plate 46. A quadrant-shaped steering rack 68 has an elongate cylindrical hub 70 mounted for rotation about the rear post 54 and having a lower end spaced above the lower plate 48. As can best be seen in FIG. 3, the steering rack 70 has an arcuate portion 72 provided with a set of internal gear teeth 74 meshed with the pinion 66. The arcuate portion 72 has its right- and left-hand ends respectively joined to right- and left-hand arms 76 and 78 which converge rearwardly to a circular portion 80 containing a centrally located hole receiving an upper end section of the cylindrical hub 70, with the portion 80 being welded to the hub 70.

A return-to-center device is provided for automatically returning the steering rack 70 and, hence, the steering wheel 26 to its centered position upon release of the steering wheel. Specifically, coupled to the quadrant arms 76 and 78, at respective locations 84 and 86 adjacent right- and left-hand ends of the arcuate portion 72, are first ends of cables 88 and 90. Second ends of the cables 88 and 90 are attached to one end of a coil tension spring 92 having its opposite end attached to an eye of an anchor bolt 94 secured to the bottom of the cab 22.

When the control mechanism 42 is in its condition shown in FIG. 3, steering rack 68 will be in a "centered" position, corresponding to the "centered" position of the steering wheel 26, and the cables 88 and 90 will be equally tensioned by the spring 92. It will be appreciated then that a rightward steering input from the steering wheel 26 will cause clockwise rotation of the pinion 66, resulting in the steering rack 68 pivoting clockwise about the post 54. This movement of the rack 68 will cause the cable 90 to be pulled forwardly, thus further loading the tension spring 92, while the cable 88 goes slack. Upon release of the steering wheel 26, the spring 92 will act through the cable 90 to return the steering rack 68 to its "centered" position which results in the pinion 66 being rotated to return the steering wheel 26 to its "centered" position.

The vehicle 10 is provided with a brake system, not shown, utilizing pressure-released, spring-applied braking elements so that braking is effected any time fluid pressure for effecting release of the brakes is absent from the system. This fluid pressure is normally supplied by an engine-driven pump and it follows then that braking will automatically be effected any time the engine stops. The source of fluid pressure for effecting release of the brake elements is also used for effecting release of a spring-applied, pressure-released latch embodied in a latch system 96 for releasably retaining the control mechanism 42 in its condition shown in FIG. 3.

Specifically, the latch system 96 includes a one-way, latch-release cylinder 98 and a latch-applying coil tension spring 100. A head end of the cylinder 98 is connected, as at a pin 102, to the mounting bracket 58 while a rod end of the cylinder is received between and connected, as at a pin 104, to upper and lower input arms 106 and 108 (FIG. 4), respectively, welded to an elongate latch arm hub 110 pivotally mounted on the post 52. The spring 100 extends parallel to the cylinder 98 and has hooks at opposite ends respectively attached to a pin 112 extending through a flange forming part of the bracket 58 and to a pin 114 mounted to the input arms 106 and 108 at a location outboard of the cylinder 98. An extension of the lower arm 108 defines a steering latch arm 116 carrying a vertical latch pin 118, which, when the rack 72 is in its "centered" position shown in FIG. 3 with no fluid pressure being routed to the cylinder 98, is biased by the spring 100 to a latch position seated in a semi-cylindrical notch or receptacle 120 provided in the steering rack arcuate portion 72 at a location half-way between the opposite ends thereof on the side opposite from the internal gear teeth 74. A stop roller 119 is mounted to the upper plate 46 in a location for abutting the arm 116 when the latter is moved to its latch release position by the hydraulic cylinder 98, as shown in FIG. 3.

Also biased to a latch position by the spring 100 is a speed/direction latch arm 122 welded to a lower portion of the latch arm hub 110 (FIG. 4) and containing an arcuate slot 124 formed at a radius about the post 54 and into which opens a notch or recess 126. Received in the slot 124 is a speed/direction latch pin 128 carried at the end of a latch pin arm 130 welded to a pivot support bar hub 132 (FIG. 4) at a location diametrically opposite from a pivot support bar 134 having one end joined to the hub 132 and an opposite end joined to a hub 136 pivotally mounted on the pivot post 54 just below the hub 70. The length of the slot 124 corresponds to the distance traveled by the pin 128 when the speed/direction control lever 28 is moved between extreme "forward" and "reverse" positions, with the notch 126 being at the location in the slot corresponding to the "neutral" position of the control lever 28. Thus, with the speed/direction control lever 28 in its "neutral" position and the hydraulic cylinder 98 deactivated, the spring 100 will act to move the arm 122 so as to engage the pin 128 in the recess 126. A "neutral" interlock switch, not shown, is mounted to the arm 122 and has its actuator positioned across the recess 126 for being engaged and moved by the pin 128 for completing a starting circuit (not shown) only when the steering and speed/direction lock pins 118 and 128 respectively, are engaged in the notches or recesses 120 and 126 to thus prevent the vehicle from being started unless the steering wheel 26 is in its "centered" position corresponding to straight ahead travel and unless the speed/direction control lever 28 is in its "neutral" position.

It will be appreciated then that control inputs to the control mechanism 42 are effected by the steering wheel 26 and by the speed/direction control lever 28. Control outputs from the control mechanism 42 occur by way of a horizontal pivot plate 138 fixed, at a location half way between its opposite ends, to an upper portion of a vertical pivot pin 140 (FIG. 4) pivotally mounted in the pivot support bar hub 132. Coupled to right- and left-hand ends of the plate 138 are front ends of pump control arm rods or links 142 and 144, respectively, having their rear ends coupled to the pump control arms 40 and 38. The speed/direction control lever 28 is pivotally mounted to the right-hand arm rest of the seat 24 at a location midway between respective connections to first ends of right- and left-hand push-pull operating cables 146 and 148, respectively, in a manner not shown but well known in the art. Opposite second ends of the cables 146 and 148 are respectively coupled to right- and left hand ends of a crank arm assembly including right- and left-hand arms 150 and 152, of equal length, that are joined to the pivot support bar hub 136. The lengths of the cables 146 and 148 may be adjusted against each other for preventing any erratic movement due to backlash being present in the assemblies containing the cables 146 and 148. In order to provide a resistance to the movement of the speed/direction control lever 28 so that the operator does not inadvertently make abrupt, large changes in the ground speed of the vehicle 10, a dashpot 154 is mounted between the crank arm 152 and a pin 156 projecting upwardly from the plate 46. The dashpot 154 is of a known construction having a piston provided with an orifice through which oil contained in the dashpot cylinder may pass to opposite sides of the piston as the dashpot is extended or retracted.

Output signals resulting from steering and/or speed and direction input signals are transferred to the pump swash plate control arms 40 and 38 by the pump control arm rods 142 and 144, respectively. For the purpose of effecting steering outputs exclusive of speed/direction outputs, and vice-versa, a tie-rod or linkage bar 158 is disposed in parallel relationship to the pivot support bar 134 and has its right- and left-hand ends respectively defined by ball joint couplers 160 and 162. Associated with each of the ball joint couplers 160 and 162 is a bolt 163, with the bolt of the coupler 160 being screwed into a threaded hole provided in a pivot plate crank arm 164, fixed to and projecting rearwardly from the pivot pin 140 at a location spaced below the pivot plate 138, and with the bolt of the coupler 162 being screwed into a threaded hole provided in a steering rack crank arm 166 fixed to and projecting rearwardly from the steering rack hub 70. Thus, the support bar 134, tie-rod 158, pivot plate crank arm 164 and steering rack crank arm 166 cooperate to form a four-bar linkage. The ball joint couplers 160 and 162 make it unnecessary for the axes of the bolts 163 to be perfectly parallel with each other in order to get the desired parallelogram motion.

In operation, steering signals cause rotation of the pinion 66 and, hence, pivotal movement of the rack 68 about the pin 54, this pivotal movement being transferred to the pivot plate 138 by the crank arm 166, tie-rod 158 and crank arm 164. Assuming the vehicle 10 to be stopped with the control mechanism 42 in its condition shown in FIG. 3 and that a right-hand turn is desired, this may be accomplished by rotating the steering wheel 26, and consequently the pinion 66, clockwise, as viewed in FIG. 3, resulting in the steering rack 68 being swung clockwise about the post 54 such that the tie-rod 158 effects clockwise rotation of the pivot plate 138. This causes the right-hand pump control rod 142 to push rearwardly on the control arm 40 of the pump 36 and causes the left-hand pump control rod 144 to pull the control arm 38 of the pump 34 forwardly. The pump 34 then acts to deliver working fluid to drive the right-hand motor 30 in reverse while the pump 36 acts to deliver working fluid to drive the left-hand motor 32 forwardly. A right-hand spin turn is thus effected. It will be appreciated that operation for effecting a right-hand turn while the vehicle 10 is traveling forwardly is accomplished in the same manner except that the right-hand wheel 14 may merely be slowed relative to the speed of the left-hand wheel 16 without being driven in reverse. Further, it will be appreciated that left-hand turns may be similarly effected by turning the steering wheel 26 in the counterclockwise direction.

Speed/direction changes are effected exclusive of steering by moving the speed/direction control lever 28 forwardly or rearwardly. Specifically, assuming the vehicle to be traveling forwardly, an increase in forward speed may be effected by pivoting the control lever 28 forwardly. This movement of the lever 28 will result in the cable 148 pushing on the crank arm 152 while the cable 146 pulls on the crank arm 150. This will cause clockwise rotation of the pivot support bar hub 136 and, hence, rearward swinging of the pivot support bar 134. The pivot pin 140 and the attached pivot plate 138 are swung rearwardly about the fixed post 54 which results in the pump control arm rods 142 and 144 both being pushed rearwardly which in turn effects rearward pivotal movement of the pump control arms 38 and 40 so as to increase the pump displacements and consequently increase the forward driving speed. Of course a decrease in speed may be similarly effected by pivoting the speed/direction control lever 28 rearwardly towards its centered "neutral" position. Further, it is apparent that direction changes can be effected by moving the control lever across its "neutral" position.

What is claimed is:
1. In a vehicle steering and speed/direction control mechanism for a dual path hydrostatic transmission including a pair of pumps respectively coupled for supplying working fluid to, and receiving return fluid from, a pair of hydraulic wheel drive motors respectively coupled to a pair of drive wheels and including control arms which are pivotable for effecting changes in the displacement of the pumps and direction of fluid flow through the pumps and, hence, changes in the speed/direction of the drive motors, a pair of control rods having first ends respectively coupled to the pair of control arms and second ends respectively coupled to a pivot plate at a pair of locations spaced in opposite directions from a pivot axis defined by a vertical pivot post fixed to the control plate and mounted for rotation in the end of a pivot support bar mounted for swinging about a second axis defined by a vertical fixed post spaced a preselected first distance from said pivot post, a first train of motion transfer elements connected between a steering input member and the pivot plate for turning the latter in opposite directions from a centered position in response to moving the steering input member in opposite directions from a centered position, and a second train of motion transfer elements being connected between a speed/direction control input member and the pivot support bar for pivoting the latter in opposite directions in response to movement of the speed/direction control input member in opposite directions from a neutral position, the improvement comprising: said first train of motion transfer elements including parallel first and second crank arms; said first crank arm being joined for pivoting with said pivot plate; said second crank arm being mounted for pivoting about said fixed post exclusive of said pivot support bar; and a tie-bar extending parallel to said pivot support bar and having opposite ends pivotally coupled to said first and second crank arms at respective locations spaced apart by a second distance substantially equal to said first distance, whereby pivoting of said second crank arm in response to steering input signals will result in said tie-rod transmitting motion causing pivoting of said first crank arm and said pivot plate so as to cause steering control outputs to be delivered to the control arms of the pumps so as to effect differential fluid displacements from said pair of pumps, and consequently, differential speeds of said pair of motors respectively coupled to said pair of pumps to thereby effect steering of the vehicle.

2. The steering and speed/direction control mechanism defined in claim 1 wherein the respective connections of the opposite ends of the tie-bar to said first and second crank arms are ball and socket connections.

3. In a steering and speed/control mechanism including a pivot support bar mounted for pivoting about a first fixed axis in opposite directions from a centered position in response to speed/direction inputs, the pivot support bar having a free end, a pivot plate mounted to said free end of said pivot support bar for pivoting about a second axis extending parallel to said fixed first axis and spaced therefrom by a preselected first distance, said pivot plate including first and second connection points located along a first line of centers which is substantially parallel to a second line of centers passing through said first and second axes when the pivot support bar is in its centered position, and first and second pump control rods being respectively coupled to said pivot plate at said first and second connection points and being adapted for transmitting steering and speed/control outputs to control arms of first and second pumps forming part of a dual path hydrostatic transmission for driving opposite drive wheels of a vehicle, the improvement comprising: first and second, parallel crank arms respectively coupled for pivoting with said pivot plate about said second axis and for pivoting about said first axis exclusive of said pivot support bar; a tie-bar extending parallel to said support bar and having opposite ends respectively pivotally attached to said first and second crank arms at locations spaced apart a second distance substantially equal to said first distance; and a steering input arrangement coupled to said second crank arm for causing pivotal movement of the latter to opposite sides of a centered position corresponding to a straight ahead driving condition of said the vehicle, whereby steering inputs will cause said second crank arm to pivot about said fixed first axis and said pivot plate to pivot about said second axis to thereby effect steering independently of speed/direction control.

4. The steering and speed/direction control mechanism defined in claim 3 wherein said tie-bar includes ball joints at its opposite ends.

* * * * *